United States Patent
Find et al.

(10) Patent No.: US 10,315,154 B2
(45) Date of Patent: Jun. 11, 2019

(54) METHOD FOR THE RECOVERY OF CARBON DIOXIDE FROM AN ABSORBENT WITH REDUCED SUPPLY OF STRIPPING STEAM

(71) Applicant: Union Engineering A/S, Fredericia (DK)

(72) Inventors: Rasmus Find, Vejle (DK); Jan Flensted Poulsen, Vorbasse (DK)

(73) Assignee: Union Engineering A/S, Fredericia (DK)

( * ) Notice: Subject to any disclaimer, the term of this patent is extended or adjusted under 35 U.S.C. 154(b) by 155 days.

(21) Appl. No.: 15/535,394

(22) PCT Filed: Dec. 10, 2015

(86) PCT No.: PCT/DK2015/050389
§ 371 (c)(1),
(2) Date: Jun. 12, 2017

(87) PCT Pub. No.: WO2016/091267
PCT Pub. Date: Jun. 16, 2016

(65) Prior Publication Data
US 2017/0361267 A1 Dec. 21, 2017

(30) Foreign Application Priority Data
Dec. 11, 2014 (EP) .................................. 14197385

(51) Int. Cl.
*B01D 53/14* (2006.01)
(52) U.S. Cl.
CPC ..... *B01D 53/1475* (2013.01); *B01D 53/1418* (2013.01); *B01D 53/1425* (2013.01); *B01D 2257/504* (2013.01); *B01D 2259/65* (2013.01); *Y02A 50/2342* (2018.01); *Y02C 10/06* (2013.01)

(58) Field of Classification Search
None
See application file for complete search history.

(56) References Cited

U.S. PATENT DOCUMENTS

| | | | |
|---|---|---|---|
| 3,962,404 A | 6/1976 | Giammarco et al. | |
| 4,146,569 A | 3/1979 | Gimmarco et al. | |
| 4,844,876 A * | 7/1989 | Oliveau | B01D 53/1468 423/220 |
| 4,889,700 A * | 12/1989 | Elgue | B01D 53/1468 423/220 |
| 9,903,648 B2 * | 2/2018 | Briglia | F25J 3/0223 |

(Continued)

FOREIGN PATENT DOCUMENTS

WO 2004005818 A2 1/2004

OTHER PUBLICATIONS

International Search Report for PCT/DK2015/050389, dated Jan. 3, 2016; 3 pages.

*Primary Examiner* — Tam M Nguyen
(74) *Attorney, Agent, or Firm* — Quarles & Brady LLP (57) ABSTRACT

The present invention relates to a method for recovering carbon dioxide from an absorbent rich on gaseous carbon dioxide, in which the energy used for separation of absorbent and carbon dioxide in a stripping column is reduced by using two stripper columns having different operating pressures and recycling heat transfer fluid from the stripper off gas in an energy efficient manner.

16 Claims, 2 Drawing Sheets

(56) References Cited

U.S. PATENT DOCUMENTS

| | | | |
|---|---|---|---|
| 2008/0196587 A1* | 8/2008 | Ha | F25J 3/0266 95/204 |
| 2014/0017622 A1* | 1/2014 | Chen | B01D 19/0005 432/29 |
| 2015/0166915 A1* | 6/2015 | Mak | C10L 3/104 95/94 |
| 2015/0307415 A1* | 10/2015 | Rafique | C07C 2/84 518/703 |
| 2016/0121261 A1* | 5/2016 | Lee | B01D 53/1425 96/181 |
| 2017/0333831 A1* | 11/2017 | Chen | B01D 19/0015 |
| 2017/0361266 A1* | 12/2017 | Find | B01D 53/1425 |
| 2018/0290100 A1* | 10/2018 | Fillatre | B01D 53/1418 |

* cited by examiner

METHOD FOR THE RECOVERY OF CARBON DIOXIDE FROM AN ABSORBENT WITH REDUCED SUPPLY OF STRIPPING STEAM

The present invention relates to a method for recovering acid gas, and preferably carbon dioxide, from an absorbent rich on gaseous acid gas, in which the energy used for separation of absorbent and acid gas in the stripping process is reduced by use of at least two stripper columns operating at different pressures and further by reuse of stripping medium.

BACKGROUND OF THE INVENTION

Carbon dioxide recovery plants are widely used to clean and/or recover carbon dioxide released e.g. from combustion of hydrocarbons, fermentation and gas processing. The recovered carbon dioxide can optionally be liquefied and sold as an end-product or utilized in the production of a given plant.

In a typical absorber-regenerator system, recovery/removal of carbon dioxide is performed by introduction of the feed gas in an absorber, where the gas contacts a lean solvent flowing down the absorber. The carbon dioxide is at least partially absorbed by the lean solvent and the carbon dioxide depleted gas leaves the absorber for further processing or discharge.

The solvent containing the carbon dioxide is then treated to release the carbon dioxide from the absorbent most often by stripping, and the carbon dioxide may be recovered or further purified and the absorbent is reused to remove further carbon dioxide from an incoming gas.

Conventional technologies available for recovering the absorbent and carbon dioxide, respectively, include stripping. The absorber-regeneration system typically allows continuous operation for recovery of carbon dioxide.

In designing processes and determining parameters resulting in the required high purity carbon dioxide and at the same time at the highest rate of product yield, the further downstream purification steps often comprise open and closed loop systems, wherein the lean streams of absorbent, which may still contain remnants of carbon dioxide, are further processed and recycled to extract even more carbon dioxide from the absorbent. Implementing such loop systems thereby facilitates the recovery and reuse of streams, such as absorbent and/or water, in order to reduce costs and waste.

However, the further processing for regeneration of absorbent or extracting more carbon dioxide from the absorbent also requires additional energy, such as for cooling, heating and pressurising. In general, the energy consumption required per unit yield increases with the purity of the absorbent, i.e. the energy consumption required for recovering the last remnants of carbon dioxide from a lean stream of absorbent is higher per unit yield as compared to the recovery of the first units of e.g. a carbon dioxide-rich absorbent stream.

Several plants for the recovery of carbon dioxide improving on the overall energy efficiency have been described. US 2013/0055756 relates to such a recovery plant, wherein lean absorbent from the regenerator tower is recirculated to the top of the regenerator tower using conventional reboiling, and the mixed stripper off gas is compressed and condensed to recirculate solvent to the regenerator tower for further recovery. An intermediate condensing heat exchanging step is included where the lean absorbent and the mixed gas are heat exchanged. The energy efficiency however is in the heat pump system, 6, located in and in between the absorption tower and the regeneration tower.

WO 2004/005818 describes a method for regeneration of absorbent wherein a lean and semi-lean absorbents are generated by passing the loaded absorbent through a first regenerator providing a lean absorbent and a second regenerator providing a semi lean absorbent where low pressure steam to at least the first regenerator is provided by steam generated in the same or another process.

WO 2008/063082 also describes a method for regeneration of absorbed carbon dioxide, wherein heat energy is recovered from the carbon dioxide gas. An absorbed carbon dioxide stream is subjected to a stripping procedure thereby creating a heated gaseous carbon dioxide-rich stream and a liquid carbon dioxide-lean absorbent stream. The heated gaseous carbon dioxide-rich stream is subjected to a number of compression steps with intermittent addition of cooling water, and heat is recovered from the compressed gas using a heat exchanger. The recovered energy may be used for heating the liquid carbon dioxide-lean absorbent stream in a regeneration reboiler.

Thus, energy is recovered from the compressed heated carbon dioxide and this heat may be used to reboil a fraction of the lean absorbent in order to decrease the overall energy consumption of the carbon dioxide recovery process.

However, in large facilities, even a minor decrease in the energy consumption per unit of carbon dioxide yield is of great economical benefit. Therefore, there is an ongoing need for designing processes and parameters resulting in the recovery of carbon dioxide at lower energy expenditure. In addition to energy expenditure there is an equally important economic aspect in reducing other resources consumed per unit carbon dioxide yield, such as the amount of absorbent and/or water required in the process.

Hence, it is an object of the present invention to further reduce the overall energy consumption of acid gas recovery processes as well as reducing the consumption of additional resources such as water, and it is a further object to provide a process with flexibility in the energy consumed for the stripping process.

SUMMARY OF THE INVENTION

The above mentioned objects are achieved by the method of the present invention, which is for recovering acid gas from a liquid acid gas-rich absorbent (L1) comprising the steps of:

a. providing the liquid acid gas-rich absorbent (L1) having absorbed acid gas therein,
b. separating the liquid acid gas-rich absorbent (L1) in a first liquid acid gas-rich fraction (L1_1) and a second liquid acid gas-rich fraction (L1_2);
c. separating acid gas from the first fraction of the acid gas-rich absorbent stream (L1_1) in a first stripping column (A2_1) having a first pressure, p1, in order to provide a first acid gas-containing gas stream (G1_1) and a first liquid acid gas lean absorbent stream (L2_2);
d. separating acid gas from the second fraction of the acid gas-rich absorbent stream (L1_2) in a second stripping column (A2) having a second pressure, p2, using a gaseous stripping medium (G2) in order to provide a second acid gas-containing gas stream (G1_2) and a second liquid acid gas-lean absorbent stream (L2),
e. mixing the first acid gas-containing gas stream (G1_1) and the second acid gas-containing gas stream (G1_2) to provide a acid gas-containing gas stream (G1);

f. transferring heat from the acid gas-containing gas stream (G1) to a stream of heat transfer fluid (L4) in order to provide a cooled acid gas-containing stream (G3) and a heated stream (L4');

g. separating the heated stream (L4') into a recovered gaseous stripping medium (G4) and a liquid heat carrier (L5), h. providing the recovered stripping medium (G4) directly or indirectly to the first stripping column (A2_1) having the first pressure, p1;

wherein the first pressure, p1, is lower than the second pressure, p2.

With this method stripping steam is circulated in a loop in exchange with the heat transfer medium which in turn is circulated in a second loop. Thereby stripping steam recovered from the combined stripper off gases is supplied to cover at least part of the stripping process, i.e. in the first stripping column, and thereby externally supplied heat is reduced. Hence an overall energy reduction is obtained where external energy is replaced with steam energy generated from heat exchange of the stripper off gas and a heat transfer fluid. The acid gas in the first stripper is efficiently stripped from the absorbent solely using recovered stripping medium and consequently heat required for reboiling sufficient stripping medium in the second stripper will be markedly reduced.

Providing two strippers operating at different pressures, and recirculating stripping steam partly recovered from the acid gas containing gas stream, entails that a substantial amount of external energy is saved compared to prior art processes where the stripping steam is provided by traditional reboiling using externally generated heat.

Also, since the first pressure, p1, in the first stripping column is lower than the pressure, p2, in the second stripping column the degree of pressurisation of the stripping medium may be reduced. Hence, the overall energy consumption in the process may be reduced.

Another advantage of the method of the invention is that it allows for the flexibility in directing fractions of the feeding stream (the liquid acid gas-rich absorbent) to one or the other stripper and adjusting the pressure of the respective strippers. This is useful depending on whether there is a demand for steam over electricity and vice versa, that is where the steam can be used for electricity production.

A further advantage of the invention is that the method provides optimal lean absorbent recovery.

In a particular embodiment the flow ratio between the first fraction of the acid gas-rich absorbent stream (L1_1) and the second fraction of the acid gas-rich absorbent stream (L1_2) is 1:1 to 1:4, preferably 1:2 to 1:3 based on volume.

In this setup the feed stream (the acid gas loaded absorbent) is divided so as to allow the stripping in the first stripping column having the lower pressure to be stripped using recovered stripping medium alone. Hence a large fraction of the stripping steam is generated without providing external power for a stripper reboiler. Hence, in addition to the reduction in operational costs the stripper reboiler (i.e. corresponding to the third heat exchanger (A6) connected to the second stripping column A2) may be omitted from the first stripping column A2_1. Most preferred is that the first fraction of the acid gas-rich absorbent stream constitutes 30% (Vol/Vol) of the feed stream, i.e. within the range 1:2 to 1:3.

In another particular embodiment the first pressure, p1, is in the range of 0.6 to 1.5 bara, preferably 0.8 to 1.2 bara, such as 0.9, 1.0 or 1.1 bara.

In yet an embodiment the second pressure, p2, is in the range of 0.9 to 2.5 bara, preferably 1.2 to 2.0 bara, more preferred 1.6 to 2.0 bara, such as 1.7, 1.8 or 1.9 bara.

In other embodiments when the first pressure is 0.6 to 1.5 bara and the second pressure is 0.9 to 2.5 bara and preferably the first pressure is 0.9 bara and the second pressure is 1.8 bara.

In a preferred embodiment of the present invention, the liquid heat carrier (L5) is used as at least part of the heat transfer fluid (L4), thereby facilitating a further recovery of the liquid as heat transfer fluid by providing a loop of e.g. water/steam when the absorbent is aqueous. Hence, a large part of the heat transfer fluid used to provide the stripping steam from the stripper off gas comes from an internal open cycle. It is contemplated that the remaining part of the heat transfer fluid may be supplied from other parts of the process or be externally supplied.

The absorbent is in a preferred embodiment aqueous, such as an aqueous solution of an akanolamine.

Preferably when the absorbent is aqueous it can be a sterically hindered amine, such as AMP, an alkanolamine such as an alkanolamine having 1 to 3 alkanol radicals, each alkanol radical having 1, 2 or 3 carbon atoms, and water. Examples of suitable alkanolamines are monoethanolamine (MEA), diethanolamine (DEA), and triethanolamine (TEA), MEA being the absorbent of choice since it is well tested cheap and proven effective.

When aqueous, the heat transfer fluid, recovered stripping medium etc. will primarily be constituted by water/steam. With the method according to the present invention it has proven possible to reduce the amount of energy required in this open loop for the acid gas recovery as well as saving water—since the need for make up water is minimal.

Consequently, acid gas, e.g. carbon dioxide, from the feed stream and remaining acid gas in the lean absorbent is recovered partially by using vapour originating from the stripper process. This saves energy, since less lean absorbent has to be reboiled to provide sufficient stripping medium.

Recycling the vapour from the process itself saves energy, since less lean absorbent has to be reboiled in a traditional manner using steam generated by external energy to provide sufficient stripping medium.

Also, vapour/water from the stripping medium originating from the aqueous absorbent is recirculated and reused. Thus, both water and energy required for providing the heat transfer fluid at the right temperature, which is well above ambient, may be reduced.

In terms of the present invention, water and remaining acid gas in the lean absorbent stream (L2) is recovered by heating and returned to the second stripping column (A2).

The energy for heating of the liquid acid gas-lean absorbent stream (L2) from the second stripping column (A2) to provide a gas/liquid heated acid gas-lean absorbent stream (L2') is provided by traditional heating. However, according to the present invention less heating energy to reboil the liquid acid gas-lean absorbent stream (L2) is required since only part of the feed stream is provided to the second stripping column (A2).

In an embodiment, the recovered stripping medium (G4) is compressed to provide a compressed recovered stripping medium (G4') to be provided directly to the first stripping column (A2_1). This ensures a smooth circulation of the compressed recovered stripping medium (G4') into the first stripping column without the need for further equipment. Hence, in addition to utilisation of the heating capacity the recirculation of the stripping medium is easily facilitated by the pressure difference.

The method according to the present invention thereby facilitates the use of an alternative source of thermal energy for providing a part of the stripping medium. The source of the thermal energy is provided by the recovered stripping medium (G4), which originates from the combined stripping procedures and is recovered together with the recovery of the thermal energy from the acid gas-containing gas streams (G1 and G1_1) also originating from the stripping procedures. Accordingly, the method of the present invention facilitates an energy efficient way to recover acid gas from a liquid acid gas containing absorbent.

According to the present invention the transfer of heat from the acid gas-containing gas stream (G1) to a stream of heat transfer fluid (L4) is facilitated by a heat exchanger. In one embodiment the heat transfer in step c. is provided by bringing the heat transfer fluid (L4) in direct contact with the acid gas-containing gas stream, that is, for example when looking at FIG. 1 G1 (comprised of G1_1 and G1_2) is cooled to provide the cooled acid-containing stream G3 and the heated stream (L4').

Direct contact of the two streams increases the utilisation of the heat contained in the acid gas containing gas stream (G1), since no heat is absorbed in surfaces of equipment facilitating the exchange. Thus, a direct contact cooler is a preferred unit for the cooling of step c. Accordingly, the heat transfer is performed so that the temperature of the heated stream (L4') is approximately equal to the temperature of the acid gas containing gas stream (G1), and the temperature of the cooled acid gas-containing stream (G3) is approximately equal to the temperature of the heat transfer fluid (L4). Complete transfer of the heat—depending on the temperature difference—can be obtained by adjusting the dimensions of the direct contact cooler and/or the flow ratio of the respective streams. In general, the skilled person will be able to determine a suitable height of a cooler given flow and temperatures and/or the flows given the height and the temperatures.

Indirect heat exchange may also be employed and the advantages of the invention will equally apply. However, direct heat exchange is preferred.

In a specific embodiment where the acid gas is carbon dioxide and the flow rate of the carbon dioxide containing gas stream (G1) is 2400 kg/h, the temperature is 102° C., the flow rate of the heat transfer fluid (L4) is 22000 kg/h and the temperature of the heat transfer fluid (L4) is 70° C., the height of the direct contact cooler is app. 4 m and the diameter is app. 0.7 m when the packing material is pall rings (random packing). This will provide a complete transfer of heat from the carbon dioxide containing gas stream to heat transfer fluid, providing a cooled carbon dioxide containing stream (G3) having a temperature of app. 70° C. and a heated stream (L4') having a temperature of app. 102° C.

In the prior art methods, the heat is typically recovered using indirect heat exchangers, i.e. where the fluids are maintained separate in order to prevent mixing. When using direct contact, the heat transfer may result in the heated stream (L4') containing remnants of dissolved acid gas therein.

However, by cooling with direct contact it is possible to achieve a more efficient recovery of the heat present in the acid gas-containing gas stream (G1). Accordingly, a major part of the water present in the acid gas-containing gas stream (G1) leaving the strippers is returned to the first stripper and, consequently, the overall consumption of water in the acid gas recovery process is reduced, since the water which is used in its vapour form as stripping medium is recycled in a very efficient manner. Hence, only minor add up of water is necessary, i.e. less than 1% (based on weight) of the feed flow rate. Furthermore, dissolution of remnants of acid gas in the heat transfer fluid (L4) resulting from the direct contact heat transfer does not infer an overall loss of acid gas. The dissolved acid gas in the recovered stripping medium (G4) is readily recovered in the stripping procedure since the, optionally compressed, recovered stripping medium (G4') is used in the first stripping column (A2_1) where acid gas may be recovered.

Also, when using direct cooling, the pressure drop in the unit will be lower than when using indirect cooling and hence the pressure of the cooled acid gas-containing stream (G3) will be higher, and the final product, the acid gas product stream (G5), will ultimately need less pressurisation to provide it in suitable form for further processing.

In an embodiment pertaining to the use of a direct contact heat exchange, the carbon dioxide containing stream (G1) is compressed to a compressed carbon dioxide containing stream (G1') before the heat transfer step c. In a further embodiment applying direct heat exchange the separation of step d. is provided by the steps of:

i) depressurising the heated stream (L4') to provide a depressurised stream (L4")
ii) separating the depressurised stream (L4") by flashing in a first flashing column (A9) to provide the recovered stripping medium (G4) and a liquid stream (L4''');
iii) further depressurising the liquid stream (L4''') to provide a second depressurised stream (L4'''') having a pressure which is lower than the pressure of the liquid stream (L4'''),
iv) separating the second depressurised stream (L4'''') in a third separating unit (A10) to provide a second gas (a) and the liquid heat carrier (L5);
v) re-compressing the second gas (a) to provide a re-compressed second gas (b); and
vi) feeding the re-compressed second gas (b) to the first flashing column (A9) where it leaves the flashing column as part of the recovered stripping medium (G4).

By the steps provided the method of the invention provides a means for providing the stripping medium at a minimum input of energy. Furthermore, by circulating water in the system in a closed loop in direct contact with the streams to be treated, the supply of both make up water and energy otherwise needed to reboil the carbon dioxide lean absorbent, is minimized.

In a specific embodiment all the steps 1-2 and i) to vi) are repeated, preferably 2, 3 or 4 times. In such an embodiment, the repetitions may be in series and/or parallel. Including more repetitions of the steps i) to vi) will increase the amount of vapour further.

It is also contemplated that the heat transfer in step c. may be provided by indirect heat exchange, and wherein prior to the heat transfer step c., the heat transfer fluid (L4) is depressurised to a pressure which is lower than the pressure of the liquid heat carrier (L5). It follows that in a specific embodiment of applying indirect heat exchange the separation of step d. is provided by the steps of d.—:

a. separating a heated stream (L4') by flashing in a first flashing column (A9) to provide the recovered stripping medium (G4) and a liquid stream (L4''');
b. further depressurising the liquid stream (L4''') to provide a second depressurised stream (L4'''') having a pressure which is lower than the pressure of the liquid stream (L4'''),
c. separating the second depressurised stream (L4'''') in a third separating unit (A10) to provide a second gas (a) and the liquid heat carrier (L5);

d. re-compressing the second gas (a) to provide a re-compressed second gas (b); and
e. feeding the re-compressed second gas (b) to the first flashing column (A9) where it leaves the flashing separation unit as part of the recovered stripping medium (G4).

In a specific embodiment all the sub steps d.a. to d.e. are repeated, preferably 2, 3 or 4 times. In such an embodiment, the repetitions may be in series and/or parallel. Including more repetitions of the steps d.a to d.e will increase the amount of vapour further.

All the following features and variants relate to the common steps and may apply equally to all embodiments, i.e. irrespective of direct and indirect heat transfer. Accordingly, in an embodiment anyone or more of L4', L4", L4''', L4'''', preferable L4" and/or L4'''', are heated by a heat source, preferably a low value heat source. Supplying additional heat to any of these streams will provide an increased vapour pressure of that particular stream and thus result in an increased mass flow of G4. Heat may in one embodiment be taken from the absorption column preceding the stripping step.

In yet an embodiment the liquid acid gas-lean absorbent stream (L2) is heated to provide a gas/liquid heated acid gas lean absorbent (L2') which is separated to provide the gaseous stripping medium (G2) and a recovered liquid absorbent stream (L3). The recovered liquid absorbent stream (L3) are then in a further embodiment together with the second liquid acid gas lean absorbent stream (L2_2) cooled and recirculated to the absorption column (A17).

In this way as much absorbent as possible is reused in the absorption process. Preferably the cooling is separate for the streams since the temperature of the streams are not the same. This will save operational costs.

In yet an embodiment the recovered liquid absorbent stream (L3) is fed to the upper part of the absorption column (A17) and the second liquid acid gas-lean absorbent stream (L2_2) is fed to an intermediate part of the absorption column (A17). This embodiment provides a more efficient absorption since the recirculated absorbent is fed to the absorber at a point where the concentration of acid gas in the absorbent match the concentration in the absorbent within absorber. The recirculated absorbent from the second stripping column (A2), which is the cleaner recovered absorbent, is fed at the top part of the absorber, whereas recovered absorbent from the first stripping column (A2_1), which is provided by use of the recovered stripping medium, and thus contains small amounts of acid gas is fed to a portion of the absorption column where the absorbent has been partly loaded with acid gas.

In a presently preferred embodiment the acid gas is carbon dioxide.

FIGURES

Examples of embodiments according to the present invention are in the following described in more detail with reference to the schematic drawings, in which.

STREAMS AND INFLUENTS/EFFLUENTS

Throughout the description and claims streams and influents/effluents are denoted by the following: temperate liquid acid gas/carbon dioxide-rich absorbent L0; liquid acid gas/carbon dioxide-rich absorbent L1; first liquid acid gas/carbon dioxide-rich fraction L1_1; second liquid acid gas/carbon dioxide-rich fraction L1_2; liquid acid gas/carbon dioxide-lean absorbent stream L2; Second liquid acid gas/carbon dioxide-lean absorbent L2_2; gas/liquid heated acid gas/carbon dioxide lean absorbent L2'; recovered liquid absorbent stream L3; heat transfer fluid L4; heated stream L4'; depressurised stream L4"; liquid stream L4'''; second depressurised stream L4''''; warmed heat transfer fluid or condensed stripping medium L5; second liquid stream L6; feeding gas G0; acid gas/carbon dioxide lean gas G0_1; acid gas/carbon dioxide-containing gas stream G1; first fraction acid gas/carbon dioxide containing gas stream G1_1; compressed first fraction acid gas/carbon dioxide containing gas stream G1_1'; second fraction acid gas/carbon dioxide containing gas stream G1_2; stripping medium G2; cooled acid gas/carbon dioxide-containing stream G3; recovered stripping medium G4; compressed recovered stripping medium G4'; acid gas/carbon dioxide product stream G5; second gas a; compressed second gas b.

Components

Throughout the description and claims the components of the plant are denoted by the following: First heat exchangers A1, A1_1, A1_2 and A1_3; first stripping column A2_1; second stripping column A2; heat recovery unit A3; second heat exchanger A4; first separator A5; third heat exchanger A6; second separator A7; first pressure reducing unit A8; flash separation unit A9; third separator A10; first pressure increasing unit A11; second pressure increasing unit A12; second pressure reducing unit A13; mixer unit A14; third pressure increasing unit A15; second mixing unit A16; absorption column A17; splitting unit A18.

DETAILED DESCRIPTION OF THE INVENTION

The illustrations appended to the present description should be understood as a section of a larger facility. All features and variants of each of the embodiments described herein apply equally to all embodiments. Accordingly, features detailed in respect of the method may apply equally to the plant and vice versa. For simplicity, accessory equipment is not included in the figure. However, a person skilled in the art will readily appreciate the type and positions for such equipment. As examples of accessory equipment can be mentioned pipes (e.g. T-pieces when constituting the mixing units), pumps, valves (e.g. diverter valves when constituting the splitting units), condensers for condensation of water and/or chemical absorbent from the discharged gases, means for replenishing water and/or absorbent etc.

Throughout the description and claims the terms "rich", "lean", and "depleted" refers to the amount of e.g. carbon dioxide or absorbent contained in a specific stream, and the denotation may be used to distinguish between different streams resulting from the various separation steps and should be construed as being relative to each other in a particular separation step.

In the following detailed description the invention will be described with reference to carbon dioxide as an example of an acid gas. The invention should not be limited thereto and all embodiments apply equally to acid gases in general, such as $CO_2$, $H_2S$, $SO_2$ etc.

Hence, the method will now be described in further detail with reference to carbon dioxide as the acid gas and an aqueous absorbent, but the steps and features would equally apply to any other acid gas and absorbent usable in the method of the invention.

Figure 1:
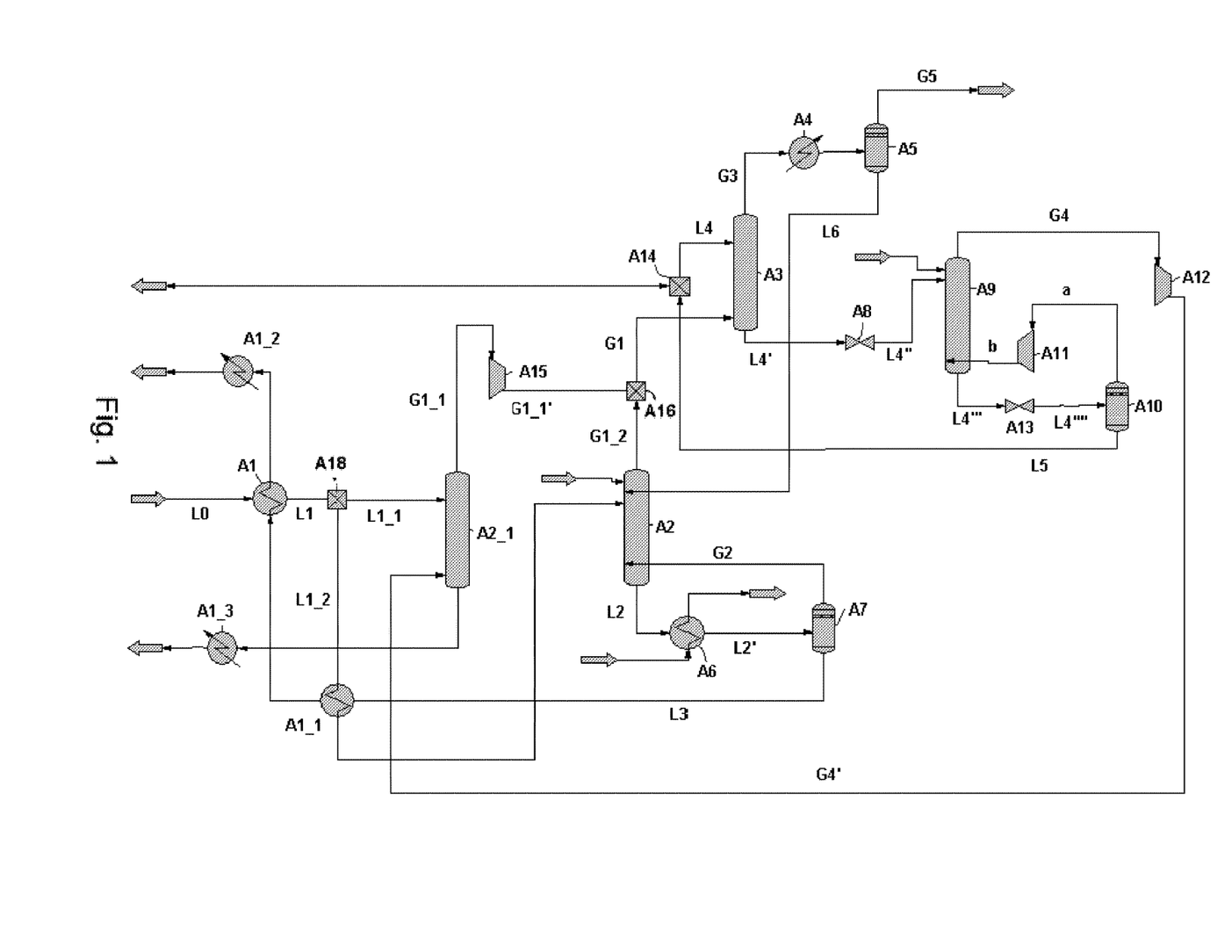
FIG. 1 illustrates the method and plant for the recovery of acid gas according to the invention

Referring now to FIG. 1 the method according to the invention is illustrated in greater detail. The schematic illustration should be construed as a downstream section following the absorption of acid gas from a gas source. The carbon dioxide rich absorbent, L0, is in the embodiment shown heated in a first heat exchanger A1 to provide a liquid carbon dioxide-rich aqueous absorbent stream, L1, having absorbed gaseous carbon dioxide.

The carbon dioxide absorbed in the liquid carbon dioxide-rich absorbent, L1, may originate from any kind of carbon dioxide source. The source of carbon dioxide may originate e.g. from the combustion of fossil fuels, flue gases, from production of synthetic gases or from a production line for filling carbonated beverages. Preferred is a flue gas.

The absorbent preferably absorbs chemically. Hence, the liquid carbon dioxide-rich absorbent, L1, comprises a suitable absorbing agent for carbon dioxide or other acid gases. The absorbing agent used for absorption of gaseous carbon dioxide may be any solvent known to be able to absorb carbon dioxide and/or acid gases, such as a sterically hindered amine, such as AMP, a solution of an alkanolamine, more preferred an alkanolamine having 1 to 3 alkanol radicals, more preferred alkanol radicals having 1, 2 or 3 carbon atoms, in an aqueous solution. Examples of suitable alkanolamines are monoethanolamine (MEA), diethanolamine (DEA), and triethanolamine (TEA), MEA being the absorbent of choice since it is well tested cheap and effective. The concentration of absorbent is typically in the range of 5-40% in water. An example is monoethanolamine being a 35% solution of MEA in water.

It is known that carbon dioxide is separated from alkanolamine absorbents by heating, preferably to a temperature of 90° C. and higher, preferably above 100° C., such as 102° C. to 112° C. and typically, 104° C. to 106° C. which is achieved by the first heat exchanger, A1, shown in the embodiment. The pressure of the liquid carbon dioxide-rich absorbent, L1, may be increased (not shown in the figure) to above atmospheric, such as 1-4 bara, preferably 1 to 2 bara, or to a pressure which is higher than the pressure of the stream leaving the absorption column. The stripping process itself may typically be operated at or slightly above ambient pressure. In the higher temperature range the pressure will typically be above atmospheric.

The liquid carbon dioxide-rich absorbent is split in two fractions in the splitting unit A18 to provide a first liquid carbon dioxide-rich fraction L1_1 and a second liquid carbon dioxide-rich fraction L1_2.

The first liquid carbon dioxide-rich fraction L1_1 is stripped in a first stripping column, A2_1, using a compressed recovered stripping medium, G4', said stripping medium substantially comprising steam, i.e. water vapour. Advantageously according to the invention the compressed recovered stripping medium is recirculated water from the stripping procedure itself (see below).

The compressed recovered stripping medium is the stream, G4', which is substantially free of absorbent and comprises water vapour with a low content of carbon dioxide. In the context of the present invention, very low is below 10 mole-% more preferred below 5 mole-%. The pressure of the compressed recovered stripping medium, G4', is in a preferred embodiment higher than the pressure in the first stripping column, A2_1. In an embodiment the temperature of the compressed recovered stripping medium, G4', is higher than the temperature of the heated first liquid carbon dioxide-rich absorbent fraction, L1_1, and more specifically higher than 100° C. preferably in the range of 105° C. to 120° C., preferably around 115° C. This will provide a more efficient stripping of carbon dioxide from the absorbent.

In the first stripping column, A2_1, carbon dioxide is stripped from the absorbent to provide a first fraction of carbon dioxide-containing gas stream, G1_1, and a second liquid carbon dioxide-lean absorbent stream, L2_2.

The first fraction of carbon dioxide-containing gas stream, G1_1, is provided at temperature and pressure conditions which are above the evaporation conditions of water. Accordingly, the first fraction of carbon dioxide-containing gas stream, G1_1, is a mixture of carbon dioxide and water vapour.

The second liquid carbon dioxide-lean absorbent stream, L2_2, typically leaves the lower part of the first stripping column, A2_1. However it is contemplated that the stream may be drawn from any suitable position.

The second liquid carbon dioxide-rich fraction L1_2 is similarly stripped, in a second stripping column, A2, using a stripping medium, G2. Hence, in the second stripping column, A2, carbon dioxide is stripped from the absorbent to provide a second fraction of carbon dioxide-containing gas stream, G1_2, and a second liquid carbon dioxide-lean absorbent stream, L2. The second stripping column A2 is operated at a higher pressure than that of the first stripping column A2_1.

The second liquid carbon dioxide-lean absorbent stream, L2, typically leaves the lower part of the second stripping unit, A2. However it is contemplated that the stream may be drawn from any suitable position. The liquid carbon dioxide-lean absorbent stream, L2, is subsequently heated by indirect heat exchange in the third heat exchanger, A6, to provide a gas/liquid heated carbon dioxide lean absorbent stream, L2', which is a gas/liquid mixture. The reboiling is normally obtained by use of a closed steam generating loop but other means are contemplated. In the embodiment shown, the gas/liquid mixture is separated in a second separator, A7, providing evaporated stripping medium G2, and recovered liquid absorbent L3. The evaporated stripping medium G2 is fed to the second stripping column A2, and the recovered liquid absorbent stream L3 is returned to the absorption column A17, preceded by heat exchange with the temperate liquid carbon dioxide-rich absorbent, L0, and the second liquid carbon dioxide-rich fraction L1_2, respectively—i.e. as shown in a plurality of first heat exchangers A1, A1_1, A1_2. It is also contemplated that only one heat exchanger is used and the heat exchange is with either one of the streams. In the embodiment shown the second first heat exchanger the A1_2 is cooling may be provided by water.

In the context of the present invention the term "lean" or "depleted" is intended to mean a stream containing an amount of absorbed carbon dioxide which is lower than the amount of the carbon dioxide in liquid carbon dioxide-rich absorbent, L1. Thus, the liquid carbon dioxide-lean absorbent streams, L2 and L2_2, comprise less that 10 mole-% carbon dioxide, typically less than 5 mole-% carbon dioxide. Advantageously the recovered liquid absorbent, L3, typically contains less than 3 mole-% carbon dioxide. Typically, the ratio of carbon dioxide in L1 compared to L2_2 and L3 (L1:L2_2 and L1:L3), respectively is 2:1 and 3:1.

The first and second fractions carbon dioxide containing gas streams G1_1 and G1_2 are mixed in the second mixing unit A16 to provide a carbon dioxide-containing gas stream, G1. It is also contemplated that the streams are mixed in the heat recovery unit, i.e. the mixing unit A16 may be omitted.

In the embodiment shown the first fraction carbon dioxide containing gas, G1_1, is compressed in a third pressure increasing unit, A15, to provide a compressed first fraction carbon dioxide containing gas, G1_1' at a pressure enabling to mix with the second fraction carbon dioxide containing gas stream G1_2. Compressing before mixing at this stage efficiency since the volume to be compressed is lower as compared to compressing to an even higher pressure using the second pressure increasing unit A12.

It is also contemplated that the carbon dioxide-containing gas stream, G1, may be compressed (not shown) before the heat transfer step in the heat recovery unit A3.

Part of the thermal energy comprised in the carbon dioxide-containing gas stream, G1, is transferred to the heat transfer fluid, L4, thereby providing a cooled carbon dioxide-containing gas stream, G3, and a heated stream, L4'.

The heat transfer is performed in a heat recovery unit, A3. It is preferred that the heat exchange is by direct contact, where the heat transfer fluid, L4, and the carbon dioxide-containing gas stream, G1, are in physical contact with each other.

By using direct contact the heat exchange will be more efficient and can reach almost 100% depending on the size and/or the flow of the respective streams, i.e. that temperature of heat transfer fluid L4 and carbon dioxide-containing stream G3 approximate. In addition, both water condensed from the carbon dioxide containing gas stream, G1, and water used as make up water will be mixed and may be used in the recirculation to the first stripping column A2_1.

It necessarily follows that the temperature of the heat transfer fluid, L4, is lower than the temperature of the carbon dioxide containing gas stream, G1. In an embodiment the temperature of the carbon dioxide containing gas stream, G1, is in the range of 90° C. to 115° C. and the heat transfer fluid, L4, is in the range of 65° C. to 95° C.

Thus, in an exemplary embodiment the heat exchanger is a direct contact cooler, and the temperature of the heat transfer fluid, L4, is app. 70° C., the temperature of the carbon dioxide-containing gas stream, G1, is typically 102° C. and the mass flow ratio of the respective streams, G1:L4, is app. 1:9 (kg/h)/(kg/h) and the height of the heat transfer of the direct contact cooler is app 4 m and the diameter is app 0.7 m when the packing material is pall rings (random packed).

With these relative values a complete heat transfer will occur so that the temperature of the heated heat transfer fluid is approximately the same as the temperature of the carbon dioxide-containing gas stream, G1, and the cooled carbon dioxide-containing stream, G3, has the same temperature as the heat transfer fluid, L4. It is contemplated that the temperatures, flows and dimensions may vary. Depending on the choice of a specific parameter the skilled person will be able to determine the remaining parameters for example using any simulation program suitable for thermodynamic calculations; such programs are well known in the art.

Accordingly, this step provides recovery of thermal energy from the carbon dioxide-containing gas stream, G1, to the heat transfer fluid, L4. The cooling also results in the condensation of water vapour present in the carbon dioxide containing gas providing a heated stream, L4', comprising condensed water vapour from the carbon dioxide containing gas stream, G1, as well as the heat transfer fluid, L4, now heated.

This cooling of the carbon dioxide containing gas stream, G1, provides water from the process which is to be further processed and recirculated to the stripping step in the first stripping column as the stripping medium. In particular embodiments this also provides the heat transfer fluid. The heat transfer fluid, L4, may be externally supplied, be derived from the absorption procedure preceding the method of the invention or a combination of all of the above.

The cooled carbon dioxide-containing stream, G3, described above is further heat exchanged and separated in the first separator, A5, to provide carbon dioxide product stream, G5, and the second liquid stream, L6. This further cooling of the cooled carbon dioxide-containing stream, G3, ensures that even more water (fluid) is removed from the carbon dioxide gas. At this point the carbon dioxide product stream, G5, gas will contain below 5 mole-% water when the temperature and pressure is app. 45° C. and app. 1.3 bara respectively. If desired the carbon dioxide product stream, G5, may be subjected to a final purification step, such as condensation, distillation, adsorption or a combination.

The heat recovery unit, A3, is in the embodiment shown a direct contact cooler which is the preferred heat recovery unit. The heated stream, L4', provided by the cooling step is subsequently depressurised into a depressurised stream, L4". The depressurisation is preferably obtained by means of a valve, more specific a pressure reducing valve, A8. The depressurised stream, L4", is a gas/liquid mixture. The stream is depressurised to a pressure below that of the heated stream, L4', and preferably to sub atmospheric in order to provide a liquid/gas mixture, i.e. below 1 bar/1 atm. Typically, the pressure is reduced to about half of the pressure of the preceding stream, e.g. from about 1.4 bar to about 0.7 bar etc.

A heat transfer loop is included for providing a liquid heat carrier L5. The flash separation of the depressurised stream, L4", provides a liquid stream, L4''', and the recovered stripping medium G4. The liquid stream, L4''', of condensed water is further pressure reduced in a second pressure reducing unit, A13, to provide a second depressurised stream, L4'''', said stream is a gas/liquid mixture. The pressure is similarly preferred substantially halved such as to 0.4 bara (when the first pressure reduction is to 0.7 bara). The second depressurised stream, L4'''', is then separated in the third separator, A10, to provide the liquid heat carrier, L5, substantially constituted of water, which is recirculated and mixed with makeup water to provide the heat transfer fluid, L4.

Before mixing the pressure of the heat transfer fluid, L4, may be increased to correspond to the pressure of the stripping system in the second stripping column, A2, which is typically around 0.9 to 2.5 bara, preferably 1.8 bara.

The separation in the third separator, A10, also provides a second gas, a, of water vapour. This stream is recompressed to the operating pressure of the flash separation unit, A9, to provide a compressed second gas, b, which is supplied to the flash separation unit, A9, where it is flashed with the depressurised stream, L4", which provides the recovered stripping medium, G4.

Hence, with the circulation the amount of steam that is extracted from the liquid phase which is to be used as the stripping medium is increased in a simple manner and with a minimum of energy supply.

In an embodiment anyone or more of L4', L4", L4''', L4'''', preferably L4" and/or L4'''', are heated by a heat source, preferably a low value heat source. Supplying additional heat to any of these streams will provide an increased vapour pressure of that particular stream and thus result in an increased mass flow of G4. The heat may be taken from any suitable place of the process itself or from an external heat source. For example the heat may be taken from the second liquid acid gas/carbon dioxide-lean absorbent L2_2 and the recovered liquid absorbent stream L3 facilitated by the heat exchanger A1_n (i.e. A1_3 and/or A1_2). In another variant the heat may be taken from absorption column, A17, where the heat of absorption may be transferred to any of the streams above. A further advantage of this is that the temperature in the absorber is not too high. By these set ups the use of cooling water will be further reduced.

The recovered stripping medium, G4, provided by the flash separation is then recompressed in the second pressure increasing unit, A12, resulting in a compressed recovered stripping medium, G4'. The second pressure increasing unit may be operated with vacuum but suitable alternatives are contemplated. The compressed recovered stripping medium, G4', has a temperature which is substantially higher than the temperature of the recovered stripping medium, G4. The heat follows from the recompression. The compressed recovered stripping medium, G4', is subsequently fed to the first stripping column, A2_1, as the stripping medium.

Figure 2:
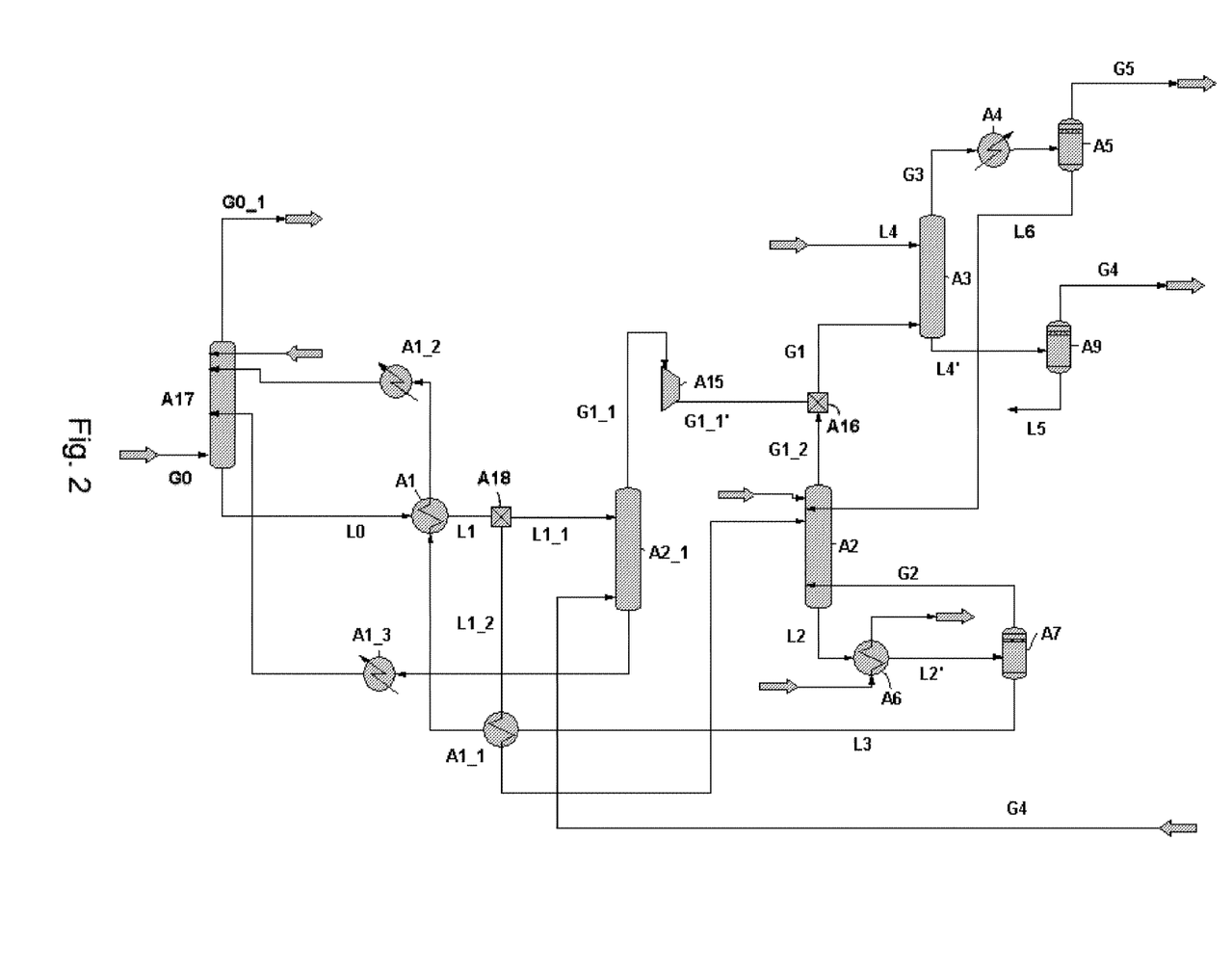
FIG. 2 illustrates a section of the method and plant with recirculation to an absorption column.

In the embodiment shown in FIG. 2 the streams and elements as also shown in FIG. 1 are the same. Hence, for the same streams and components detailed description can be found in conjunction with FIG. 1.

In the embodiment shown the recovered stripping medium, G4, may be provided by the steps shown in FIG. 1 or, it may be supplied directly from the flash separation unit, A9, with (not shown) or without prior compression.

The second liquid carbon dioxide-lean fraction, L2_2 and the recovered liquid absorbent stream, L3, are recycled to an absorber, A17 as part of or the majority of the absorbent which absorbs acid gases from the feeding gas, G0. The recovered liquid absorbent, L3, which is the cleaner fraction is cooled and fed to the upper part of the absorption column, A17. The second liquid carbon dioxide-lean fraction, L2_2, is fed to an intermediate part of the absorption column. The second liquid carbon dioxide-lean fraction, L2_2, may comprise a slightly higher amount of acid gas/carbon dioxide since it has been stripped using the recycled stripping medium. Feeding at different parts of the column provides a very efficient absorption of acid gas from the feed gas. The absorption step itself provides a temperate liquid carbon dioxide rich absorbent, L0, which is heated in exchange with the recovered absorbent stream, L3, to provide the liquid carbon dioxide-rich absorbent, L1, which is treated as described above and a carbon dioxide lean gas G0_1, which is disposed, recycled to the original source or absorbed again.

The term "reduction of overall energy consumption" is to be understood broadly. According to the present invention reduction of overall energy consumption means that the factual energy supplied is reduced and/or the amount of utilisable energy recovered is increased. The reduced energy consumption may be viewed in isolation for the relevant section of the larger facility. However, the reduced energy consumption for such a section view in isolation should not come at the expense of increased energy consumption in the upstream and/or downstream sections of the larger facility.

Furthermore, the external thermal energy needed in the process may be replaced by electrical energy which in some places may be of an advantage if for example when generated by alternative energy sources, such as wind power.

The consumed energy may for example be in the form of electricity, high pressure steam, low pressure steam and/or hot water for warming purposes. Accordingly, mutatis mutandis, decreasing the amount of at least one of these forms of energy in the section of the larger facility is to be understood as a reduction of overall energy consumption.

The invention claimed is:

1. A method for recovering an acid gas from a liquid acid gas-rich absorbent (L1) comprising the steps of:
   a. providing the liquid acid gas-rich absorbent (L1) having absorbed acid gas therein,
   b. separating the liquid acid gas-rich absorbent (L1) in a first liquid acid gas-rich fraction (L1_2) and a second liquid acid gas-rich fraction (L1_2);
   c. separating acid gas from the first fraction of the acid gas-rich absorbent stream (L1_1) in a first stripping column (A2_1) having a first pressure, p1, in order to provide a first acid gas-containing gas stream (G1_1) and a first liquid acid gas lean absorbent stream (L2_2);
   d. separating acid gas from the second fraction of the acid gas-rich absorbent stream (L1_2) in a second stripping column (A2) having a second pressure, p2, using a gaseous stripping medium (G2) in order to provide a second acid gas-containing gas stream (G1_2) and a second liquid acid gas-lean absorbent stream (L2),
   e. mixing the compressed first acid gas-containing gas stream (G1_1) and the second acid gas-containing gas stream (G1_2) to provide a acid gas-containing gas stream (G1);
   f. transferring heat from the acid gas-containing gas stream (G1) to a stream of heat transfer fluid (L4) in order to provide a cooled acid gas-containing stream (G3) and a heated stream (L4');
   g. separating the heated stream (L4') into a recovered gaseous stripping medium (G4) and a liquid heat carrier (L5);
   h. providing the recovered stripping medium (G4) directly or indirectly to the first stripping column (A2_1) having the first pressure, p1;
   wherein the first pressure, p1, is lower than the second pressure, p2.

2. The method according to claim 1, wherein the flow ratio between the first fraction of the acid gas-rich absorbent stream (L1_1) and the second fraction of the acid gas-rich absorbent stream (L1_2) is 1:1 to 1:4 preferably 1:2 to 1:3.

3. The method according to claim 1, wherein the first pressure is 0.6 to 1.5 bara and the second pressure is 0.9 to 2.5 bara, preferably the first pressure is 0.9 bara and the second pressure is 1.8 bara.

4. The method according to claim 1, wherein the liquid heat carrier (L5) is used as at least part of the heat transfer fluid (L4).

5. The method according to claim 1, wherein the absorbent is aqueous.

6. The method according to claim 1, wherein the recovered stripping medium (G4) is compressed to provide a compressed recovered stripping medium (G4') to be provided directly to the first stripping column (A2_1).

7. The method according to claim 1, wherein the heat transfer in step f. is provided by bringing the heat transfer fluid (L4) in direct contact with the carbon dioxide-containing gas stream (G1) to obtain the heated stream (L4').

8. The method according to claim 1, wherein the first acid gas-containing stream (G1_1) is compressed to provide a compressed first acid gas-containing gas stream (G1_1').

9. The method according to claim 1, wherein the separation of step g. is provided by the steps of:
   i) depressurising the heated stream (L4') to provide a depressurised stream (L4")
   ii) separating the depressurized stream (L4") by flashing in a first flashing column (A9) to provide the recovered stripping medium (G4) and a liquid stream (L4''')

iii) further depressurising the liquid stream (L4''') to provide a second depressurised stream (L4'''') having a pressure which is lower than the pressure of the liquid stream (L4'''), iv) separating the second depressurised stream (L4'''') in a third separating unit (A10) to provide a second gas (a) and the liquid heat carrier (L5);

v) re-compressing the second gas (a) to provide a re-compressed second gas (b); and vi) feeding the re-compressed second gas (b) to the first flashing column (A9) where it leaves the flashing column as part of the recovered stripping medium (G4).

10. The method according to claim 9, wherein all the consecutive steps 1) to vi) are repeated, preferably 2, 3 or 4 times.

11. The method according to claim 10, wherein the repetitions are in series and/or parallel.

12. The method according to claim 1, wherein the liquid acid gas-lean absorbent stream (L2) is heated to provide a gas/liquid heated acid gas lean absorbent (L2') which is separated to provide the gaseous stripping medium (G2) and a recovered liquid absorbent stream (L3).

13. The method according to claim 12, wherein the recovered liquid absorbent stream (L3) and the second liquid acid gas lean absorbent stream (L2_2) are cooled and recirculated to an absorbent column (A17).

14. The method according to claim 13, wherein the recovered liquid absorbent stream (L3) is fed to the upper part of the absorption column (A17) and the second liquid acid gas-lean absorbent stream (L2_2) is fed to an intermediate part of the absorption column (A17).

15. The method according to claim 1 further comprising the step of optionally heating the cooled acid gas-containing stream (G3);

separating the acid gas-containing stream (G3) obtained in step f, optionally heated beforehand, in an acid gas product stream (G5) and a second liquid stream (L6), and optionally recirculating the second liquid stream (L6) to the stripping column (A2).

16. The method according to claim 1 where the acid gas is carbon dioxide.

* * * * *